(12) United States Patent
Oh

(10) Patent No.: US 10,860,645 B2
(45) Date of Patent: Dec. 8, 2020

(54) SYSTEMS AND METHODS FOR CREATION OF A LISTENING LOG AND MUSIC LIBRARY

(71) Applicant: PCMS Holdings, Inc., Wilmington, DE (US)

(72) Inventor: Hyun Oh Oh, Seoul (KR)

(73) Assignee: PCMS Holdings, Inc., Wilmington, DE (US)

( * ) Notice: Subject to any disclaimer, the term of this patent is extended or adjusted under 35 U.S.C. 154(b) by 73 days.

(21) Appl. No.: 15/539,054

(22) PCT Filed: Nov. 25, 2015

(86) PCT No.: PCT/US2015/062723
§ 371 (c)(1),
(2) Date: Jun. 22, 2017

(87) PCT Pub. No.: WO2016/109069
PCT Pub. Date: Jul. 7, 2016

(65) Prior Publication Data
US 2019/0042647 A1 Feb. 7, 2019

Related U.S. Application Data

(60) Provisional application No. 62/098,750, filed on Dec. 31, 2014.

(51) Int. Cl.
*G06F 17/30* (2006.01)
*G06F 16/635* (2019.01)
(Continued)

(52) U.S. Cl.
CPC ............ *G06F 16/636* (2019.01); *G06F 3/165* (2013.01); *G06F 16/637* (2019.01); *G06F 16/639* (2019.01); *G06F 16/683* (2019.01)

(58) Field of Classification Search
CPC .......... G06F 17/30; G06F 3/16; G06F 16/637; G06F 16/639; G06F 16/68; Y10S 707/918; Y10S 707/913
(Continued)

(56) References Cited

U.S. PATENT DOCUMENTS 8,064,819 B2   11/2011   Ingrassia
8,745,024 B2   6/2014    Chardon
(Continued)

FOREIGN PATENT DOCUMENTS

CN    1885285 A    12/2006
CN    102308295 A    1/2012
(Continued)

OTHER PUBLICATIONS

Notification of Transmittal of the International Search Report and The Written Opinion of the International Searching Authority, or the Declaration for PCT/US2015/062723, dated Mar. 15, 2016, 11 pages.
(Continued)

*Primary Examiner* — Melur Ramakrishnaiah
(74) *Attorney, Agent, or Firm* — Invention Mine LLC

(57) ABSTRACT

Systems and methods are described to monitor and record user context and engagement with music. In an exemplary method, a user device receives an audio input of a user's audio environment, for example through a microphone. From the audio input, a song playing in the user's audio environment is identified by a user device. This may be done by consulting a database of audio features. The user device determines the user context and/or a user's level of engagement with the song. The context may include the time and location at which the song was playing. The level of engagement may be determined by monitoring whether, for example, the user danced or otherwise moved to the song,
(Continued)

whether the user sang along to the song, and/or whether the user turned up the volume of the song.

19 Claims, 9 Drawing Sheets

(51) Int. Cl.
G06F 16/683 (2019.01)
G06F 16/638 (2019.01)
G06F 3/16 (2006.01)

(58) Field of Classification Search
USPC .............. 700/94; 381/56; 707/733, 918, 913
See application file for complete search history.

(56) References Cited

U.S. PATENT DOCUMENTS

| | | | |
|---|---|---|---|
| 10,346,472 | B2 | 7/2019 | Alexandersson |
| 2002/0157034 | A1 | 10/2002 | Sagar |
| 2003/0044021 | A1 | 3/2003 | Wilkinson |
| 2006/0248235 | A1* | 11/2006 | Eyer .................... G11B 27/034 710/1 |
| 2006/0294091 | A1 | 12/2006 | Hsieh |
| 2007/0074253 | A1 | 3/2007 | Takai |
| 2009/0172538 | A1* | 7/2009 | Bates ................. G06F 3/04815 715/706 |
| 2010/0023328 | A1* | 1/2010 | Griffin, Jr. ............. G10H 1/100 704/231 |
| 2010/0131558 | A1 | 5/2010 | Logan |
| 2010/0205222 | A1 | 8/2010 | Gajdos |
| 2010/0228740 | A1 | 9/2010 | Cannistraro |
| 2010/0291861 | A1 | 11/2010 | Anzures |
| 2012/0166436 | A1* | 6/2012 | Kalasapur ............ G06F 16/637 707/732 |
| 2012/0317241 | A1 | 12/2012 | Wang |
| 2013/0101264 | A1* | 4/2013 | Vermeulen ........ H04M 1/72522 386/225 |
| 2014/0056433 | A1 | 2/2014 | Emerson |
| 2014/0067827 | A1 | 3/2014 | Bilinski |
| 2014/0074783 | A1 | 3/2014 | Alsina |
| 2014/0149468 | A1* | 5/2014 | Lu ........................ G10H 1/0058 707/803 |
| 2014/0280879 | A1* | 9/2014 | Skolicki .................. H04L 69/28 707/741 |
| 2014/0335834 | A1 | 11/2014 | Emerson, III |
| 2015/0006541 | A1* | 1/2015 | Hampiholi .......... G06F 16/4387 707/741 |

FOREIGN PATENT DOCUMENTS

| | | |
|---|---|---|
| CN | 104094303 A | 10/2014 |
| CN | 104199876 A | 12/2014 |
| JP | H11120198 | 4/1999 |
| JP | 2005228455 | 8/2005 |
| JP | 2006331533 | 12/2006 |
| JP | 2007086835 | 4/2007 |
| JP | 2011059504 | 3/2011 |
| JP | 2012181884 | 9/2012 |
| JP | 2014516189 | 7/2014 |
| JP | 2014516189 A | 7/2014 |
| KR | 20140031422 A | 3/2014 |
| WO | 2012170451 | 12/2012 |
| WO | 2014029994 A1 | 2/2014 |

OTHER PUBLICATIONS

Notification of transmittal of the International Preliminary Report on Patentability, for PCT/US2015/062723 dated Apr. 19, 2017, 15 pages.
Written Opinion of the International Preliminary Examining Authority for PCT/US2015/062723 dated Nov. 29, 2016, 7 pages.
G. Keizer, "Apple has bigger plans than just song ID with Shazam deal", Computerworld, Apr. 18, 2014.
M. Waldrep "MQS—Mastering Quality Sound", May 20, 2013. Retrieved from http://www.realhd-audio.com/?p=749.
Wikipedia, "PEAQ (Perceptual Evaluation of Audio Quality)". Wikipedia, web article, updated on Jul. 18, 2014, available at https://en.wikipedia.org/w/index.php?title=PEAQ&oldid=617462066, 3 pages.
Roque, A., et. al., "The Effects of Auditory Stimulation with Music on Heart Rate Variability in Healthy Women". Clinics, vol. 68, No. 7, (2013), pp. 960-967.

* cited by examiner

702

| Song_Index | Song_Title | Song_Artist | Plays | Tot_LCP |
|---|---|---|---|---|
| ... | ... | ... | ... | ... |
| 7983663239 | My Song | Keith Jarrett | 34 | 55.84 |
| 5612690002 | Your Song | Elton John | 289 | 357.31 |
| 1760385230 | Royals | Lorde | 12 | 38.23 |
| ... | ... | ... | ... | ... |

704

| Song_Index | Listen_Time | Loc_Lat | LCP | Source | Notes |
|---|---|---|---|---|---|
| ... | ... | ... | ... | ... | |
| 7983663239 | 2013-05-21 08:16:12 | 41.40338, 2.17403 | 1.2 | LIV | |
| 5612690002 | 2013-01-06 14:18:11 | 37.551162, 126.988467 | 0.2 | LIB | |
| 1760385230 | 2013-12-04 19:10:52 | 37.802561, -122.406181 | .7 | STR | |
| 5612690002 | 2013-07-05 23:13:16 | 51.503710, -0.118822 | 1.4 | AUD | My birthday party! |
| 7983663239 | 2013-10-19 03:32:58 | 29.957202, -90.062871 | .8 | LIV | Jazz festival. |
| 1760385230 | 2013-06-09 15:47:23 | 39.916180, 116.397159 | 1.3 | AUD | |
| 1760385230 | 2013-03-10 14:05:41 | 35.662265, 139.697612 | .3 | AUD | |
| 5612690002 | 2013-02-06 14:16:26 | -33.858583, 151.213605 | .9 | LIV | |
| ... | ... | ... | ... | ... | |

FIG. 7

SYSTEMS AND METHODS FOR CREATION OF A LISTENING LOG AND MUSIC LIBRARY

CROSS-REFERENCE TO RELATED APPLICATION

The present application is a 35 U.S.C. 371 of International Application of PCT PCT/US2015/062723, entitled SYSTEMS AND METHODS FOR CREATION OF A LISTENING LOG AND MUSIC LIBRARY, filed on Nov. 25, 2015, which claims benefit under 35 U.S.C. § 119(e) from, U.S. Provisional Patent Application Ser. No. 62/098,750, filed Dec. 31, 2014, the entire disclosure of which is incorporated herein by reference.

BACKGROUND

Music is an important part of culture and everyday life. Music is played widely using many different media in many different settings. Music is played over the radio, streamed via the Internet, listened to in the car, elevator, and in the gym. Music can evoke memories of a special place or moment, such as a road trip or a wedding night. With the various methods available for listening to music, and with the overall importance of music in everyday life, there is a need for systems and methods for recognizing and storing the music that is important to people's lives.

SUMMARY

The present disclosure describes systems and methods for creating a listening log and music library. In an example embodiment, music is detected, the detected music is identified as a particular song, additional context information is associated with the identified song, and the song's identity and the additional context information is stored. In various embodiments, the music is detected and additional context information is sensed by a mobile computer processing system, such as a smart-phone and its accessories.

The disclosure describes the creation of a listens log for recording information related to detected music. A listens count point (LCP) score is developed to represent the level of attentiveness of the user to a song. In some embodiments, the LCP depends on contextual data associated with the music. The detected music can be played via a user's computer processing system, such as a smart phone, computer, or car audio system, or detected by a user's computer processing system being played from an external source, such as a radio, a concert, and the like. Additional attentiveness factors include detecting the user's awareness to the music as determined by measuring a user's actions, ambient conditions, and a user's biometric data.

To detect and identify music played from an external source, audio fingerprint technology is used in some embodiments. Some embodiments operate using a two-stage implementation of audio fingerprint technology, where audio fingerprints are supplemented by additional data from a master listens log. The additional data may include combining multiple audio fingerprints to produce a single audio fingerprint that is compared to an audio fingerprint database to identify a song.

The additional contextual information associated with identified songs is also shared with the master listens log to provide additional services for the user and the music industry. The additional services include creation of presentations associated with the detected music, marketing information for the music services, audio transition services to support playing alternate versions of the same song, and detection of illegally distributed music.

In some embodiments, the data contained in the listens log is combined with data from other sources, including email, calendar events, social networks, and the like for use in various applications.

BRIEF DESCRIPTION OF THE DRAWINGS

FIG. 7 illustrates tables included in an exemplary listens count point database.

DETAILED DESCRIPTION

Figure 1:
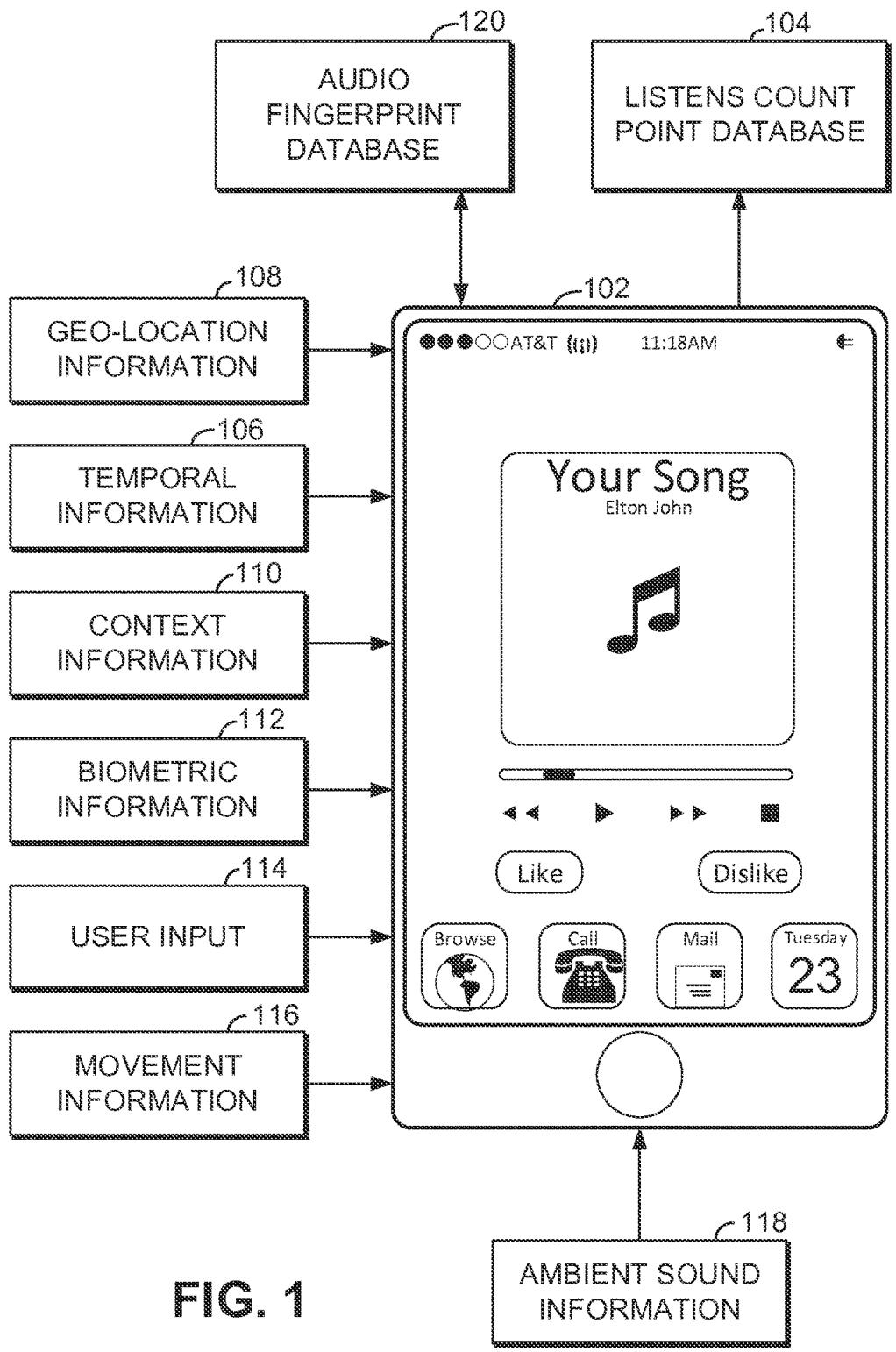
FIG. 1 is a schematic illustration of a functional architecture of a user device in a system for creating a listening log that tracks user levels of engagement.

FIG. 1 is a schematic illustration of a functional architecture of a user device in a system for creating a listening log that tracks user levels of engagement. In the example of FIG. 1, a user is provided with a user computing device, such as a smart phone 102. Exemplary user devices include cell phones, smart-phones, MP3 players, tablet computers, laptop computers, desktop computers, automobile audio systems, radios and the like. The user device may also be communicatively coupled to one or more accessories. Exemplary accessories include a microphone, a camera, a location sensor, biometric sensors, smart watches, smart glasses, clocks, and the like.

In the example of FIG. 1, music player software is provided on the user device and is being used to play the song "Your Song" by Elton John. The music played by the user device can be stored locally on the computer processing system (such as a saved MP3 music file or via a compact disc) or received through an external connection (such as streamed through a data connection or received via a radio tuner). The detected music played by the user device can be identified by metadata attached to the music. Example metadata includes file name, song title and artist fields of MP3 data, song information transmitted via a digital signal accompanying a radio signal (e.g. Radio Broadcast Data System), and the like.

The user device is capable of collecting contextual information regarding the playing of the song. For example, in some embodiments, the user device collects spatio-temporal information including information regarding the time and/or location at which the song is being played. An internal and/or network clock may be used to provide temporal information 106. A global positioning system (GPS) chipset or other location determination circuitry may be used to provide geo-location (spatial) information 108 on the location of the user during the playing of the song. Other context information 110 may also be provided. For example, a user's calendar (which may be stored locally or may be a network-based calendar) may be accessed, and it may be determined based on the calendar information that the user is on vacation, is commuting, is at home, is at the gym, and the like. Contextual information may be gathered from other sources, such as the user's email, text messages, and the like. Biometric information 112 may be collected, including, in various embodiments, information such as gaze tracking information, EEG readings, heart rate, body temperature, and the like.

The user device further collects user input 114, which may be provided via "like" and "dislike" buttons on the user device 102. Other user input 114 that may be provided to the user device 102 may include user input to a volume control, increasing or decreasing the volume of the song being played. Movement information 116 may also be collected by one or more accelerometers and/or gyroscopes in the user device 102 to provide information as to the user's movements during the song, e.g. whether the user is dancing or bouncing along to the song, is sitting still, is jogging, and the like. In some embodiments, ambient sound information 118 is collected from one or more microphones. This sound signal may be used to determine, for example, whether the user is singing along with the song, or whether the user is participating in a separate conversation while the song is playing.

Using spatio-temporal and contextual inputs 106, 108, 110, 112, the user device 102 may determine, for example, that the user listened to "Your Song" while in Sydney on Jan. 2, 2002 for winter vacation. Information indicating that the user listened to the song, along with related contextual information (or information derived therefrom), is stored in a listens count point database 104, which is described in greater detail below.

In some embodiments, when the user device 102 is not itself reproducing the song (e.g. through a media player or streaming music application), a song being played in the user's environment is identified based on the ambient sound information 118. The sound signal is converted to an audio fingerprint or hash and compared with information in an audio fingerprint database 120 (which may be a locally or remotely stored database) to identify the song.

In some embodiments, detecting the music occurs in multiple steps. In the first step, the user device is operating in a standby, or reduced power mode. The user device detects characteristics of music, such as music tones or beats. At a later step, the user device transitions to an active mode that permits full identification of the particular song initially detected. Identification of the song is conducted using a music detection algorithm. An exemplary music detection algorithm includes comparison of audio fingerprints. An exemplary song detection system based on audio fingerprinting is described in, for example, Avery Li-chun Wang, "An Industrial-Strength Audio Search Algorithm," October 2003, and Avery Li-Chun Wang and Julius O. Smith, III, WIPO publication WO0211123A3, 7 Feb. 2002, "Method for Search in an Audio Database." Audio fingerprint technology identifies music by querying excerpts of music and comparing the excerpt of the music to a database. The fingerprint database can be stored on the user device, a remote server, or a combination of the computer processing system and the remote server.

Concurrently with identifying the music, the user device detects additional contextual information. Examples of additional contextual information include location data, time data, speed, nearby wireless devices, events stored on a calendar accessible by the computer processing system, biometric data (such as eye positions, EEG, heart rate, body temperature, and the like). The additional contextual information is linked to the identified music and stored in a listens log in a database, such as a listens count point database.

In an example, a user's smartphone may detect music via its microphone. The smartphone samples the music and compares the sample to a fingerprint database to identify the song as "Royals" by Lorde. The identification can be from either a locally stored fingerprint database or a cloud-based fingerprint database. Using additional context information, the user device is able to determine that the user (or his smartphone) is located near Pebble Beach, Calif., and it is in the afternoon, particularly 15:27 on Jan. 19, 2014. The additional context information may include information indicating that other people are with the user. This can be determined by nearby wireless signals, it can be manually entered, it may be gathered from other social media networks, or other similar methods may be used. Additionally, the computer processing system can determine that the user is located in a car. Exemplary information that may be used to determine that the user is in a car can include the user's location, acceleration, syncing with a car's electronics system, and the like. In other examples, the computer processing system can also detect other methods of transportation, such as an airplane (traveling at high altitudes, high speeds, in airplane mode, etc.) or on a train (traveling along known train routes, comparing to user's calendar, etc.). The user's smartphone can also access information from other communicatively connected peripheral devices, such as a smart watch, smart glasses, heart rate monitors, Bluetooth headsets, and the like. These connected peripheral devices are able to detect the user's gaze, EEG data, heart rate, body temperature, motions, and the like. The identified song, along with the additional contextual information is stored in a database such as a listens count point database.

Figure 2:
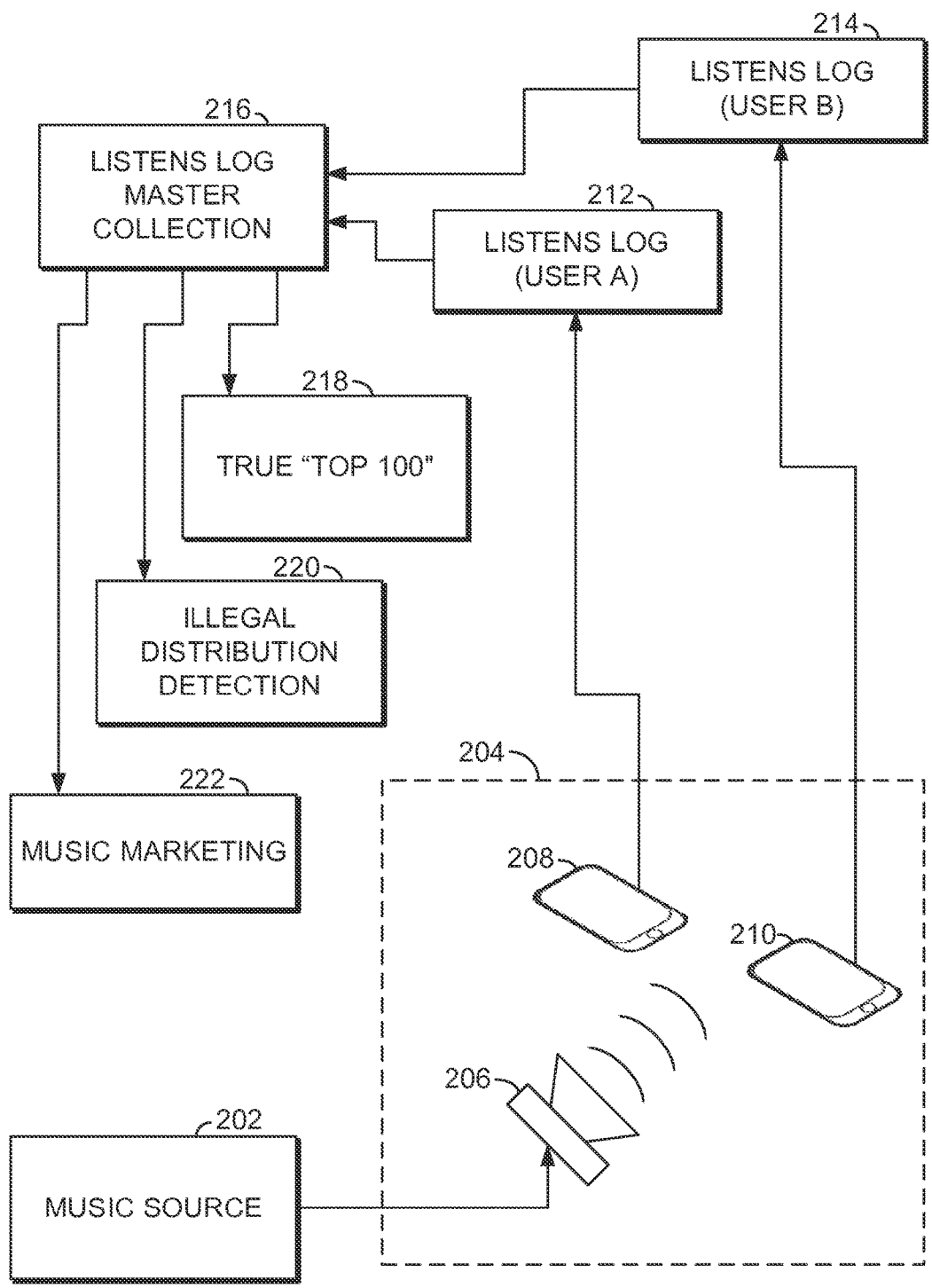
FIG. 2 is a schematic illustration of the system architecture of an exemplary system for creating a listening log that tracks user levels of engagement.

FIG. 2 is a schematic illustration of the system architecture of an exemplary system for creating a listening log that tracks user levels of engagement. In the example of FIG. 2, a song is being played from a music source 202 at a location 204. Location 204 may be, for example, a store, restaurant, or bar at which music from the source 202 is being played over one or more speakers 206. Multiple user devices may be present at the location, such as a smart phone 208 carried by a first user "User A" and a smart phone 210 carried by a second user "User B." Both user devices 208 and 210 detect the music and identify the song. Both of the user devices 208 and 210 also detect additional contextual information and store the additional contextual information with the identified song into each user's listen log, specifically listen log 212 associated with User A and listen log 214 associated with User B. The data from each user's listen log is shared with a master collection of the listens log 216. The collective information stored in the master collection 216 can be used to develop a popular music chart, detect illegal music distribution, be used for further music marketing, and other similar uses.

To develop a popular music chart 218, the master collection log can be used to determine the number of times different users have heard the music. For example, a better approximation of listeners can be obtained over traditional methods that rely on the receiving (listening) end rather than the transmission (playing) end. In addition to recording the number of listens, the additional contextual information can be analyzed to determine the listeners' level of engagement with the music, differentiating between, for example, background music that is being talked over and a song that is being sung along. In an exemplary scenario where music is played through a loudspeaker, the methods of this disclosure can be used to determine how many people in the audience are listening to the song.

To detect illegal music distribution, the master collection log 216 can be used to highlight areas that play music in public spaces. Typically, public spaces are required to have permits and/or contracts to publicly perform music. A comparison by illegal distribution detection module 220 between detected public performance (as indicated by identifying a song by several participants in a public location, among other methods) and a database of permitted public performances can highlight suspect instances of an illegal public distribution.

To assist music marketing, the master collection log can be used to provide listening contextual information, such as the listener's biographic profile, the location the song is heard, the level of engagement that a listener has with the music, and the like. Music marketing module 222 may operate based on this information to provide appropriate music advertising and/or offers to users.

Figure 3:
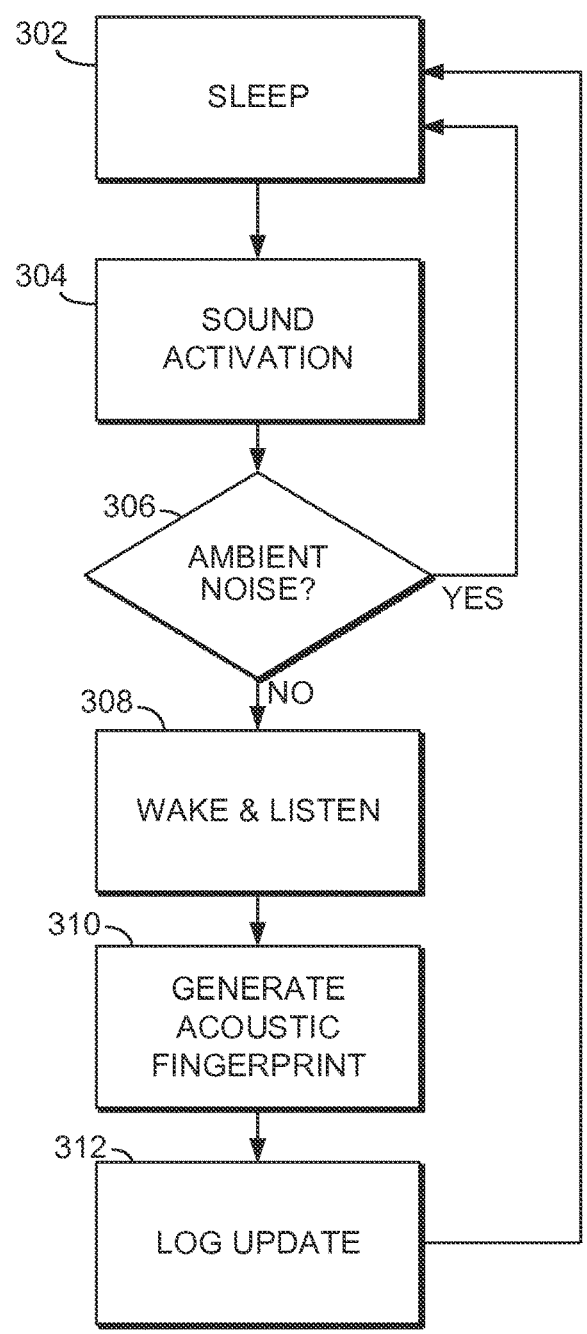
FIG. 3 is a flow chart illustrating a method employed in some embodiments for updating a listening log.

FIG. 3 is a flow chart illustrating a method employed in some embodiments for updating a listening log. At step 302, a user device is in a sleep condition, using minimal power and computing resources. At step 304, the user device detects sound and determines in step 306 if the sound was an ambient noise. If the sound is an ambient noise, the device remains in a sleep condition. If the noise was not an ambient noise, the computer processing system transitions in step 308 to an active mode (wake-up & listen) and records audio. In step 310, the computer processing system extracts data, such as an audio fingerprint, from the recorded audio. In step 312, the user device updates a listens log by identifying a song based on the audio fingerprint and recording an identification of the song in a listens log. The computer processing system exits the detection process to either return to a sleep condition, or continue to monitor the music and the additional contextual information.

In an exemplary method of identifying music, a user device detects music and generates an audio fingerprint of the song. The audio fingerprint is compared to a locally saved fingerprint database. If the audio fingerprint of the detected music correlates to a known song in the local fingerprint database, the song has been identified. The fingerprints stored in the music database include the songs that are most popular, are selected by the user, or correlate to songs that are popular among users with similar tastes in music. If the audio fingerprint is not correlated to a song stored in the local audio fingerprint database, the user can optionally transmit the audio fingerprint to a cloud-based audio fingerprint database. The user can optionally make this selection in advance, such as automatically performing this check over certain Wi-Fi connections, or may manually initiate this request each time. Otherwise, the audio fingerprint is buffered in a local waiting queue for later transmission. At a later point, either automatically or by user initiation, the computer processing system transmits the audio fingerprint to a cloud based fingerprint database. The computer processing system then receives a match from the cloud based fingerprint database. In some embodiments, the computer processing system transmits the raw sound to a remote server to compute an audio fingerprint and song identification algorithms.

Figure 4:
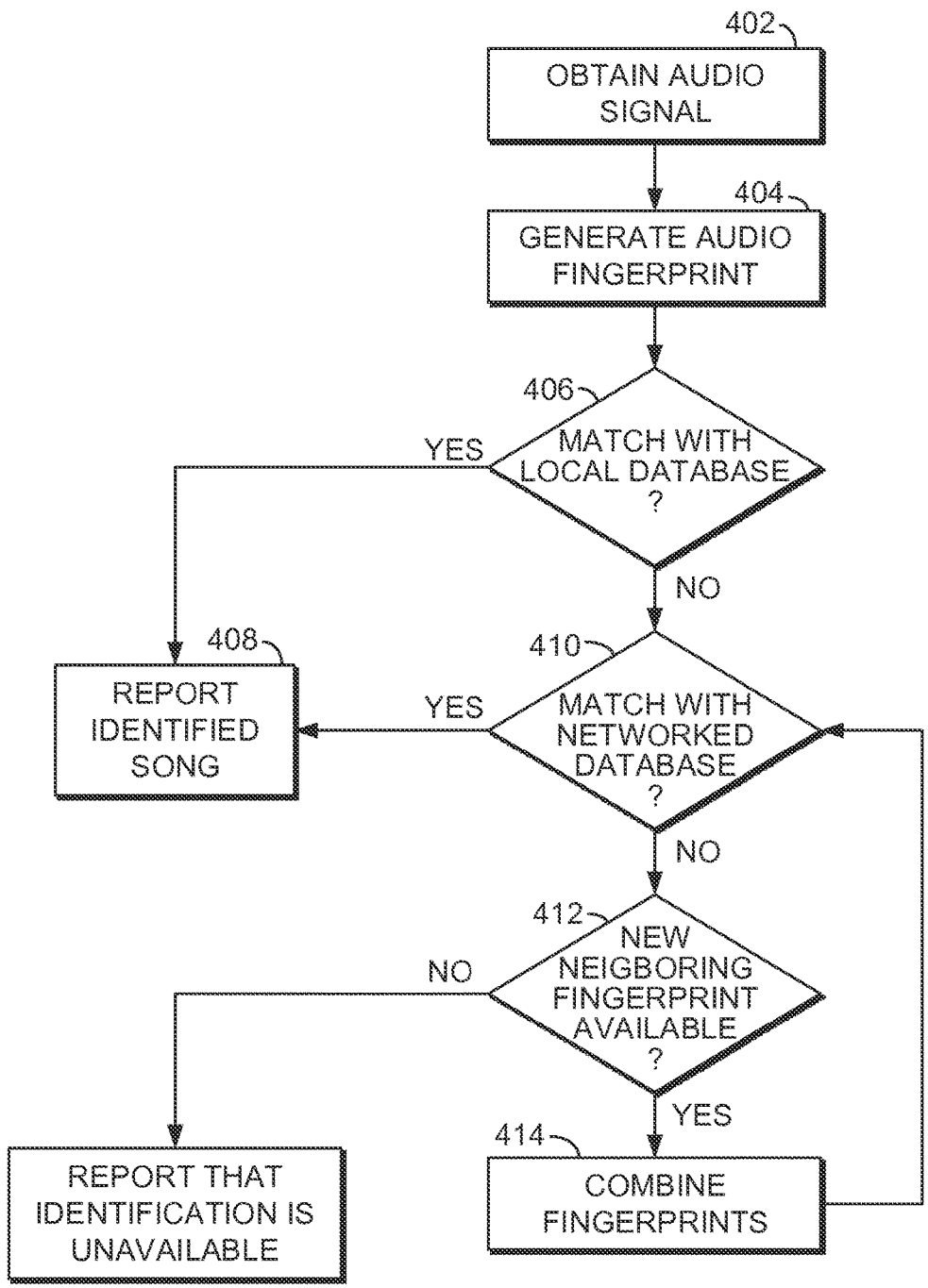
FIG. 4 is a flow chart illustrating a method employed in some embodiments for identifying a song being played.

FIG. 4 is a flow chart illustrating a method employed in some embodiments for identifying a song being played. In step 402, the user device obtains an audio signal using one or more microphones. In step 404, the user device generates an audio fingerprint from the audio signal. In step 406, the user device operates to determine whether the generated audio fingerprint matches an audio fingerprint stored in a local database. The local database may include associations between audio fingerprints and corresponding song titles and artist names, or other identifiers (including arbitrary index numbers) capable of being used to identify the song. In step 408, if the song has been identified in the local database, the identity of the song is reported, e.g. through a notification to the user and/or an update to a listens log. If the song cannot be identified using a local database, then the user device determines in step 410 whether the audio fingerprint matches a fingerprint in a networked database. Step 410 may include sending a query including the audio fingerprint to a network server and receiving a response from the network server indicating the identity of the song or indicating that no match was found. In some embodiments, data representing the audio signal itself is sent to the network server, and the network server operates to generate a fingerprint for comparison against a database. If a song is identified based on the networked database, then the identification of the song is reported in step 408 as an alert to the user and/or as an update to the listens log.

If no fingerprint match is found in step 410 based on the generated fingerprint, then an attempt may be made to determine the identity of the song by using another fingerprint obtained from a different (but nearby) user device. As an example, User A and User B are determined to be in substantially the same location. The colocation of Users A and B may be determined based on, for example, GPS coordinates of the users, presence of the users in range of a particular Wi-Fi network or the users' indication on social media (e.g. "checking in") that they are in a particular location. Consider a circumstance in which fingerprint information X collected by User A has not, by itself, been sufficient to allow User A to identify a song that is playing in the environment, and fingerprint information X' collected by User B has not, by itself, been sufficient to allow User B to identify the song. Consequently, fingerprint information X and X' are sent to a listens log master collection process, and the song can be identified using a combination of the fingerprint information X and X'. The fingerprints X and X' may be sent to the listens log master collection process along with respective context data sufficient to allow the listens log master collection process to determine that User A and User B are likely to be listening to the same song.

For example, the user device of User A detects fingerprint X' and during the time of May 20, 2014 at 16:33:03 to 16:33:13. However, a portion of the fingerprint X' in the middle may be marred by poor audio quality, and the system may be unable to identify the audio based on the poor detected audio quality. Causes for poor audio fingerprint quality can include background noises, errors, and the like. The user device of User B detects fingerprint X' at the same time and location as User A. However, a different portion of the audio fingerprint X' may be of poor quality, preventing identification based on X' alone. However, a combined fingerprint Y, derived from the fingerprint X and the fingerprint X', may be sufficient to identify the music being played in the vicinity of both User A and User B.

Exemplary equations to combine audio fingerprint X and X' are as follows:

$$Y=f(X,X')=aX+bX',$$

where $a^2+b^2=1$, and where the values of a and b may be determined based on relative power and quality factors. In another exemplary equation for generating a combined fingerprint Y, $$Y = X + X'/sqrt(pow(X) + pow(X')),$$

where $pow(X) = \frac{1}{N}\sum_{k=0}^{N-1} X_k^2.$

The combined audio fingerprint Y can be used to identify the song, and the identification of the song can be conveyed back to the user devices. Alternatively, the combined audio fingerprint Y can be communicated back to the user devices, which can in turn user the audio fingerprint Y to identify the song.

As illustrated in FIG. 4, when a user device is unable to identify a song based on an audio fingerprint generated from that user device, it is determined in step 412 whether a contemporaneous fingerprint obtained by a nearby user device is available. If a neighboring fingerprint is available (and has not already been tried), then the fingerprints are combined in step 414, and an attempt is made in step 410 to match the combined fingerprint with a fingerprint in the networked database. Where more than one possible neighboring fingerprint is available for us, the system may cycle through combinations using the available fingerprints, or it may generate a combination of more than two fingerprints.

In an exemplary embodiment, a music broadcaster, such as a radio station, or a concert promoter, provides information on broadcast music. The information on the broadcast music may include audio fingerprints, times played, and locations the music is played. The information regarding the broadcast music may be used to identify a detected song based on a partial audio fingerprint. In this example, a user is listening to a radio station and the user device detects the played music and records an audio fingerprint for comparison to a fingerprint database. The partial fingerprint can be compared to broadcast music for the corresponding location that the user is located. Additionally, this function can serve to estimate the listening audience size of a broadcast radio station. A similar method comprising a personal computer streaming audio music and a person's phone detecting the streamed audio music can also be implemented. For example, a person streaming music via a streaming service on a computer may leave the room. When no cell phones hear the streamed music, the streaming music application may prompt a user to press a button to continue playing music. If the user is not present to depress the button, the music stream stops.

Figure 5:
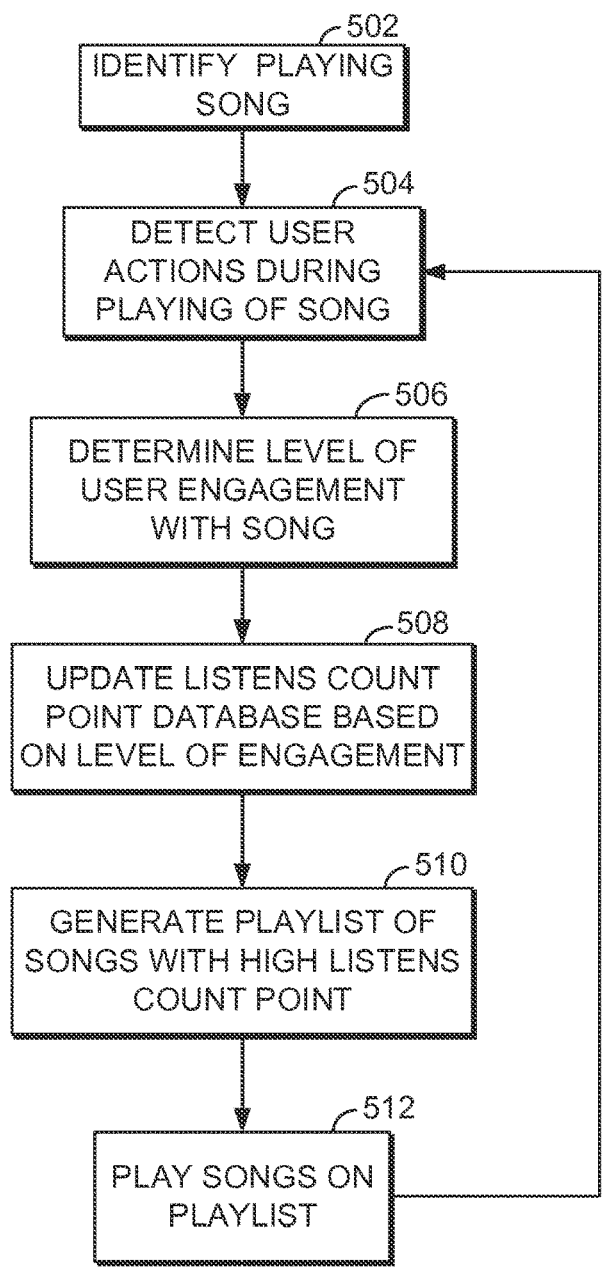
FIG. 5 is a flow chart illustrating a method employed in some embodiments for generating and updating a playlist based on user engagement with one or more songs.
Figure 6:
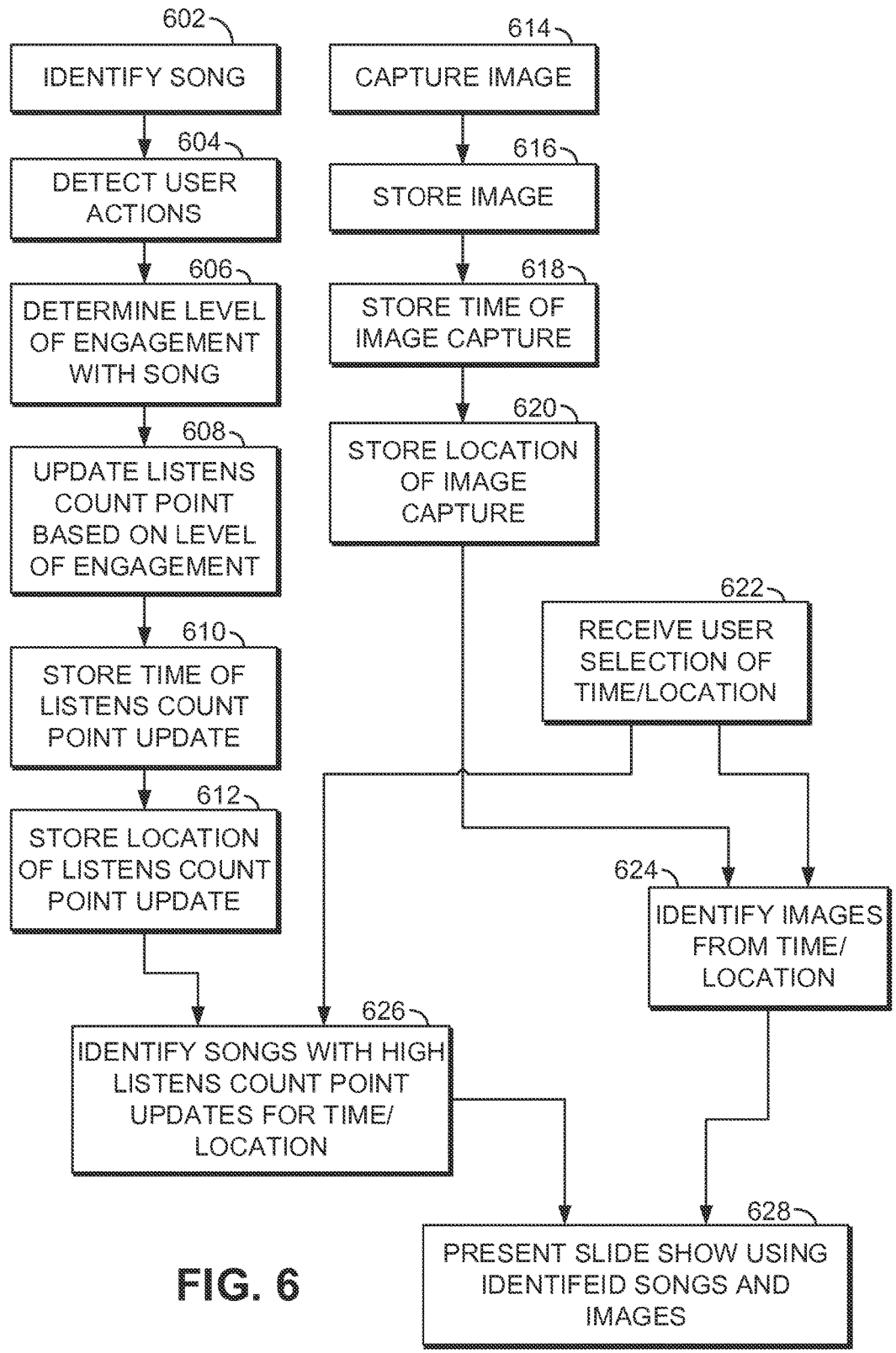
FIG. 6 is a flow chart illustrating a method employed in some embodiments for generating a musical slide show based on user engagement with one or more songs.

FIG. 5 is a flow chart illustrating a method employed in some embodiments for generating and updating a playlist based on user engagement with one or more songs. In step 502, the system (e.g. a user device, operating on its own or in communication with one or more network servers) identifies a song that is playing. Where the song is being played in the environment of the user device, the identification may be made using audio fingerprinting. Where the song is being played by the user device itself, the identification of the song may be provided by the application playing the song. In step 504, the system determines one or more actions of the user during playing of the identified song. For example, the system may determine based on input from a microphone whether the user is singing along with the song, or whether the user is engaged in a separate conversation. The system may determine whether the user is dancing or otherwise moving in time with the song, e.g. using input from one or more accelerometers and/or gyroscopes in the user device. If the user device includes a biometric sensor internally or as a peripheral, the system may determine user engagement with the song based on, for example, increases in heart rate or body temperature. The system may further determine whether the user has taken other actions that indicate a level of engagement with the song, such as turning up (or down) the volume of the song or selecting a "Like" (or "Dislike") button. In a case where the song is being played by the user device, a determination that the use has changed the volume of the song may be made based on the user's interaction with volume buttons on the user device. In a case where the song is being played by an external device, the user device may identify a volume change based on changes in the sound level of the song arriving at the microphone of the user device.

In step 506, based on the user action or actions, the system determines a level of user engagement with the song. A score representing the level of user engagement with the song is referred to herein as a listens count point (LCP). The LCP is calculated as a function of the detection, amount of attention, quality of the listening, listening time, and/or other contextual information. In some embodiments, the LCP is given as a decimal number ranging from 0 (user not listening) to a 1.0 (user fully concentrated to the highest quality content over full running time of the content), although other scales may be used. In some embodiments, the LCP associated with detected music may be higher than the maximum scale if it is multiplied by other users in the area. The LCP may be multiplied if the user's computer processing system detects other listeners present. The additional users may not increase the user's LCP score for the song, but may be included in the aggregate of information stored in a Master Listens Log. For example, if a user's device detects three people listening to the identified music and none of the other three people are reporting listens count points to a master LCP database, the additional users may be counted as having listened to the song. Additional listeners may be detected by sight, detection of wireless signals, and other similar methods.

In an exemplary method, the LCP is calculated based on one or more of the following types of information inputs: the play mode, the user's attention, the loudness and quality of the sound, and/or other contextual data, such as gaze direction, EEG, body temperature, heart rate, time stamp, GPS, schedule, and the like. In exemplary embodiments, the user's attention is measured. The more attention the user pays to the played music, the higher the LCP for that detected song. For example, though a user is wearing headphone and listening to music, the user may not be engaged with the played music if the user is simultaneously reading a book. However, when a user is doing other simple tasks, such as surfing the web or sending text messages, the user's level engagement with the played music may be higher. In exemplary embodiments, the user's level of engagement is determined at least in part by the detected gaze. The user device can capture a gaze of the user. In this case, the device analyzes the gaze and determines the user is reading or viewing other material.

In exemplary embodiments, the user's level of engagement is determined at least in part based on the extent to which the user is monitoring the device playing the music. Continuous input signals to the device through a touch screen, a keyboard, a mouse, or the like are analyzed as the user's activities. Engagement with the song may also be measured by observing the usage of the device. If the user is playing a game on the device while the device is also playing music, the LCP may be lowered.

In exemplary embodiments, the user's level of engagement is determined at least in part based on detection of one or more nearby conversations. A user participating in a conversation with other people would be evidence that the user is not listening the music. The existence of people speaking can be detected by the acquisition of sound and camera information. The same microphone input for the listens log can be used. Determining if a person is speaking to the user directly would be considered in calculation of the LCP. Speaker diarisation technology can be also incorporated to determine the situation. Specifically, an array of microphones may be used in identifying sound coming from at least two different directions, indicating the presence of at least two speakers. Additionally, head tracking can further indicate that a conversation is taking place and the user is not engaged in the music, thus lowering the LCP.

In exemplary embodiments, the user's level of engagement is determined based at least in part on a detection that the user is exercising or driving. In some embodiments, in response to a determination that a user is performing exercising or driving, the LCP is raised. Detecting that a user is driving or exercising can be done through a location logging device, wireless connections with an automobile, inputs from wearable devices, and the like.

In exemplary embodiments, the user's level of engagement is determined based at least in part on a determination that the user is singing along or keeping beat with the music. A user singing along or keeping beat with the played music indicates that the user is highly engaged in the played music and raises the LCP. Detection that a user is singing along with the detected music can be made using by an active microphone reception. A user keeping beat, like nodding or other rhythmic body movement along the beats, can be detected in several ways. A microphone can detect the sounds produced by tapping. Additionally, a smart phone's inertial sensors can also detect a user dancing, tapping, or keeping beat with the song. From the received signal of the microphone, the tapping pulses are uniquely parsed from the other ambient noises and sounds. A smart wristband can also detect tapping from a hand. Nodding or other rhythmic body movement can be detected by using cameras and/or other inertial sensors. For example, a smart glass's installed cameras and inertial sensors can detect a user's head moving, either by movement of the inertial sensors and a wobble of the image.

Different techniques may be used to determine occurrences of a user singing along with a song or occurrences of a user tapping or moving along with the song from the microphone input signal. After listening and parsing, input signal s(n) is first provided to a fingerprint extraction module. Extracted fingerprint f(i) might be compared with the fingerprint database based on one of the previously mentioned methods, and then it can determine the target music content, t(n). Using the target source signal t(n) and the received signal s(n), user behavioral features can be extracted. Equation 1 can be used to approximate s(n).

$$s(n)=t(n)*r1(n)+u(n)*r2(n)+a(n)*r3(n) \quad (EQ. 1)$$

In EQ. 1, r1(n), r2(n), r3(n) are transfer functions from the sound source to the reception microphone and are typically dominated by a room impulse response. In EQ. 1, u(n) is a singing or tapping signal excited by a user, and a(n) can be any other ambient sounds and noises. For further simplification, let r1(n)=r2(n)=r3(n)=r(n). There are several methods to blindly separate/remove those room transfer functions (referred to herein as a de-reverberation function D( ) ). When removing the effect of r(n) successfully using D( ), and subsequently removing the known signal t(n) contribution, the extracted feature signal e(n) is obtained in Equation 2.

$$e(n)=D(s(n))-t(n)=u(n)+a(n) \quad (EQ. 2)$$

In EQ. 2, e(n) is compared with the t(n) and extract instances of the user singing or moving to the music. A cross-correlation can be used to eliminate the ambient sounds a(n). The correlation coefficient can be functioned as a similarity measure. When v(n) is an extract beating feature from a target music t(n), the similarity index is determined in Equation 3.

$$\rho_{vu} = \frac{E(v(n), u(n))}{\rho_v \rho_u} \quad (EQ. 3)$$

In EQ. 3, $\rho_{vu}$=[0,1] and when $\rho_{vu}$>$thr_\rho$, it is determined that rhythmic tapping t(n) is matched with the music.

In an exemplary embodiment, the user's level of engagement with a song is determined based at least in part on detecting the user raising or lowering the volume of the music. A user raising the volume of music correlates to a higher LCP, and conversely, lowering the volume of music correlates to a lower LCP. In some embodiments, user control of volume is judged relative to the loudness of the source music. Some recorded music is mastered and recorded with a different loudness from song to song. Thus, a user raising and lowering volume may in some instances be to match the loudness of one song to the next and may not necessarily reflect relative user enjoyment of a song. Measuring the loudness of the source signal compensates for the user raising and lowering volume to match loudness.

In an exemplary embodiment, the user's level of engagement with a song is determined based at least in part on whether the user is wearing headphones. Headphones equipped with a proximity sensor can be used to confirm the user is wearing headphones. A determination that a song is being played to a user through headphones leads to a higher LCP.

In an exemplary embodiment, the user's level of engagement with a song is determined based at least in part on quality, the loudness, or both of the detected music. The quality of the music is detected through a microphone. The microphone detects the resolution (bit depth, sampling frequency, and the like) of the music. A higher quality corresponds to a higher LCP. The loudness is also detected through a microphone. In some such embodiments, an additional factor of sound quality is the music being played with immersive audio, such as 3D spatial resolution or surround sound. Immersive audio is detected using a microphone-received sound or by counting the number of audio channels, loudspeakers, and the number of objects, and the like.

An additional factor relevant to sound quality is the level of ambient noise. A quality measure of reception, similar to a signal-to-noise-ratio (SNR) is used as a factor in detecting the listener's level of engagement with a song. An additional factor may include a measured perceptual evaluation of audio quality (PEAR). In some embodiments, all of these factors of music quality and loudness are present. In an example, when a user sits in a sweet spot of 22 loudspeakers installed in a listening room and music is played with a 70 dB SPL, the LCP can be set very high, such as near 1.0. On the contrary, if the user is playing music via a built-in small loudspeaker on a phone with a 40 dB SPL in a high ambient noise environment, the LCP is low, such as near 0.1.

In an exemplary embodiment, the user's level of engagement is determined based at least in part on detected biometric data. Different styles of music affect the biometric data of a listener in different ways. For example, heart rate variability (HRV) is generally different for a user listening to classical music than it is for a user listening to heavy metal rock music. HRV is detected by wearable accessories communicatively linked to the user device. When the detected biometric data, such as the HRV, corresponds to the type of music being played, this raises the LCP, indicating that the user is engaged with the music. Additional types of biometric data are heart rate, body temperature, EEG, and the like.

In an exemplary embodiment, the user's level of engagement is determined based at least in part on an association of the identified music with particular places and/or people. A user's location can be determined by manual input, location tracking features of a smart phone, and the like. Proximity to other people is determined by sensing the presence of other user's mobile devices, by manual input, by information received from social networks, and the like. For example, when music is heard in a very remote place being visited for the first time, the song likely has a greater significance to the user. This raises the LCP and supports tagging the song for recall at a later point.

In step 508, a listens count point database is updated based on the level of engagement. For example, the database may be updated to include an entry that identifies the song and that includes the listens count point calculated for that instance of the song. The LCP database may include a running total of LCPs for a particular song. The total LCP may be a total for all users, for individual users, for a group of users, or some combination of these. In some embodiments, different databases are maintained for individual LCPs and collective LCPs.

In some embodiments, the LCP database stores information not only on LCPs, but also information on the total number of times the song has been listened to by the user (or by a group of users). In some embodiments, a user is only counted as having listened to a song if the LCP exceeds a predetermined threshold, e.g. 0.1. In some embodiments, a ratio of total LCP to the number of times the user has heard the song provides an indication of the user's level of interest in the song.

In some embodiments, the LCP information is used to generate a playlist of songs. A playlist is generated in, for example, step 510 of FIG. 5 The playlist may be selected by choosing, for example, the songs with the highest total LCP for a particular user or for a group of users. The number of songs in the playlist may be a selected number or may, for example, be a sufficient number of songs so as to fill out a selected duration of music, among other possibilities. The playlist may be open-ended, with additional songs being added (or even repeated) as long as the user is listening. The selection of songs with the highest total LCP may be a selection of songs with the highest total LCP accumulated over a particular time period, e.g., "the last six months," or "the 2010s," or the selection of songs may include songs with the highest LCP from each of a variety of periods, e.g. "your top songs of each year." Other techniques may alternatively be used for selection of a playlist based on LCP information.

In step 512, songs on the playlist are played for the user. The user's actions during playing of the songs on the playlist may be detected in step 504 and used to determine the user's continued level of engagement with the song (step 506). This allows for updating of the LCP information (step 508) on which the playlist is based. If a song is played too often, the user's interest in the song—and hence the user's measured level of engagement with the song—is likely to diminish. Thus, songs associated with a diminishing LCP may be removed from the playlist or played less frequently.

In some embodiments, LCP data is used in the generation of a musical slideshow, in which music is selected to be played alongside photos of an event (e.g. a particular place or time period). In step 602, the system identifies a song. In step 604, the system detects one or more user actions, and in step 606, the system determines the level of user engagement with the song based on the user action or actions. In step 608, the system updates a listens count point database based on the user's measured level of engagement with the song. The system also stores the time (e.g. the date) at which the user heard the song in step 610 and the location (e.g. GPS coordinates) where the user heard the song in step 612.

The user also collects one or more images, e.g. using a camera on the user device, capturing the images in step 614 and storing the images in step 616. Along with the images themselves, the system stores information on the time of the image capture (step 618) and the location of image capture (step 620). The spatio-temporal information on the time and/or location of the image capture may be stored as metatdata in the image file itself, or it may be stored in a separate data store, such as an image database.

To initiate creation of a musical slideshow, a user in step 622 selects an event of interest, which may include a selection of a time and/or a location. The user selection may be submitted in a variety of ways. For example, a user may select an event by selecting a particular album or folder in a digital photo store, by selecting a calendar event in his or her digital calendar, or by explicitly entering a range of dates or a particular location (e.g. a city, state, or country). In step 624, the system identifies a plurality of images corresponding to the selected event (e.g. images that were taken at the selected time, or in the selected location). In step 626, the system identifies a plurality of songs corresponding to the selected event. These may be, for example, songs with the highest total LCP over the selected period, or with the highest total LCP at the selected location, or some combination of the two.

In step 628, the selected songs and the selected images are presented together as a musical slideshow. For example, a display on a user device may cycle through the selected images (e.g. displaying each image for a predetermined amount of time, such as ten seconds, and switching, e.g. dissolving, to the next image) while a playlist comprising the selected songs is playing.

Using the foregoing steps or variations thereon, an automatic background music to accompany a slide show is created. In the example process, the smart phone displays photos that correspond to a certain event. The event may be a road trip, a vacation, a business trip, a wedding night, or the like. The photos may be stored locally on the smart phone, accessible via a social network, or be shared from a friend's social network. The auto-generated background music comprises songs that correlate with time spent at the certain event. The correlated songs may be songs that the user listened to with a high level of attentiveness, songs that were played often during the event, or other similar songs that have a high degree of similarity to songs that have a high LCP.

In some embodiments, a musical slideshow is generated in response to a user selection of images to include in the slideshow, with music being selected based on the spatio-temporal information (location and/or time information) of the images. Conversely, in other embodiments, a musical slideshow is generated in response to a user selection of songs to include in the slideshow, with images being selected based on spatio-temporal information associated with the songs. An auto-generated slide show can be generated based on the user selecting particular music from a list of available songs. The slide show can also include auto-generated captions, labeling the people, places, and events depicted in the slideshow's photos. The auto-generated captions may also include pre-generated images appearing with the photos that are selected based on the contextual data collected. An example would be to depict a happy-face emoji over pictures that correspond to happy moments.

An exemplary listens count point database is illustrated in FIG. 7. A database may include one or more tables, such as table 702 and table 704. Exemplary table 702 includes one entry for each song. Table 702 stores information used to identify songs along with total listens count points for those songs. (In various embodiments, the total listens count points may be a total for a particular user, or a master total for a group of users). Table 702 includes a column Song_Index that provides an arbitrary unique identifier for each song. Respective columns Song_Title and Song_Artist identify the title and artist of the song. The Plays column identifies the number of times the song has been played (as detected using the systems and methods described herein). The column Tot_LCP indicates the total listens count point value for each of the songs.

In some embodiments, a separate table 704 may be used to provide more detailed information. Table 704 is referred to as a listens log in some embodiments. Exemplary table 704 includes one entry for each time the playing of a song is detected. Table 704 includes a column Song_Index providing a unique identifier for the detected song. A column Listen_Time stores information on the time at which the song was detected, and column Loc_Lat identifies the longitude and latitude of the location at which the song was detected. In table 704, a column LCP stores the listens count point value determined for that playback of the detected song based on one or more user actions indicating a level of user engagement with the song. In the example, some of the LCP values are greater than 1.0, which may occur in embodiments based on a scale other than a 0.0-1.0 scale, or which may occur when the system detects that a plurality of users were present at the playback of the song. In the example of table 704, a column Source provides information on how the song was played. For example, the indicator LIV may be used to indicate that the song was performed live. Some embodiments may distinguish between live performances by the original artist and live performances by other artists. The indicator LIB may indicate that the song was played from the user's own music library (e.g. a collection of MP3 files). The indicator STR may indicate that the song was played using a streaming media application. The indicator AUD may indicate that the song was detected as being played back by another audio system, e.g. played back by a system other than the user device, and detected by a microphone of the user device. In some embodiments, the table 704 may include a Notes field including additional information, which may be manually entered by a user or may be populated using information from, for example, a user's digital calendar or social media information. It should be understood that other database and table structures may be used for a listens count point database besides those shown in FIG. 7.

As an example of information stored in a database, in accordance with an embodiment, a database may include information on the songs, artists, number of plays, number of listens, and highlighted moments. In an example, the user's computer processing system may store information indicating that 289 plays are detected, and the song has a Listens Count Point (LCP) score of 357.31 for the user of interest. The highlighted moments include hearing the song live played by other artists, hearing the song live played by the original artists, while on vacation, over the radio at the user's birthday party, and other times. The LCP is representative of a user's engagement with the music. One factor of the LCP is the user's attentiveness. A higher level of attentiveness results in a higher level of LCP.

In some embodiments, a user device provides a user interface through which a user may manually input that user's level of interest (or engagement) in the played song. Once detected and identified, the user can manually enter a like or a dislike for the identified song. With reference to FIG. 1, the user's smart phone detects Your Song by Elton John and is presented with an option to "Like" or "Dislike" the song by pressing either button on the smart phone's touch screen. The LCP is adjusted positively for a user pressing "Like" and negatively for a user pressing "Dislike."

In an exemplary embodiment, the data contained in listens count point database, including the play counts, the listen counts, and the associated contextual data, is used by higher level applications. The associated contextual data includes the contextual data detected as explained throughout this disclosure and can also be obtained from social networks (Facebook, MySpace, Friendster, Photobucket, etc.), a user's digital photo album, videos, emails, calendar appointments, and the like. The information can be stored locally on the computer processing system, accessible through a network connection, be affiliated with the user (on the user's Facebook page), or be shared with the user (from a friend's Facebook page). To develop additional content from the multi-modal information via a higher level application, technologies such as deep neural network and machine learning approaches may be used.

Figure 8:
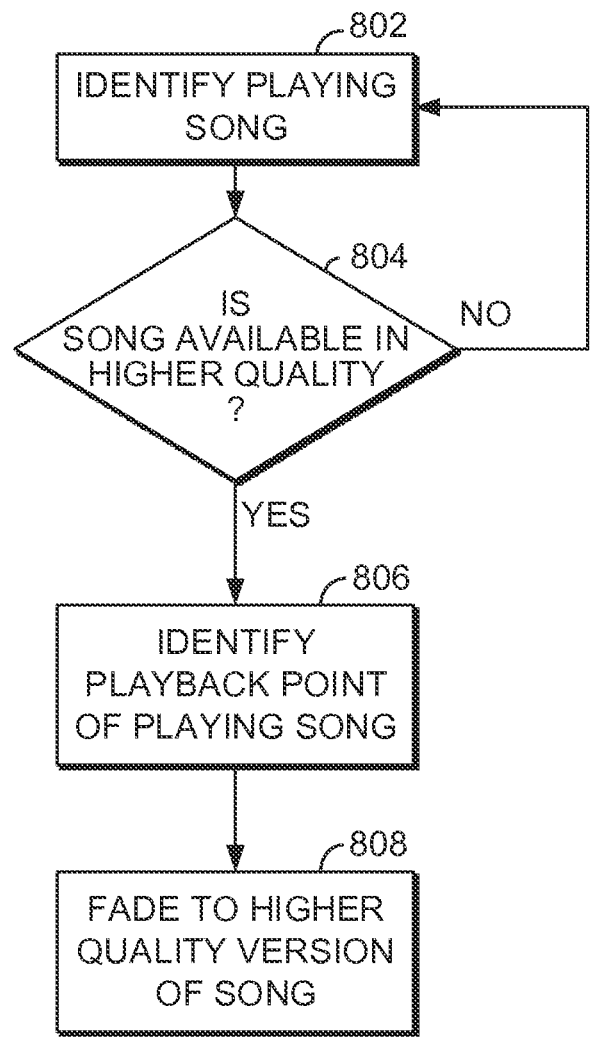
FIG. 8 illustrates a method performed in some embodiments for increasing quality of music playback.

FIG. 8 illustrates a method performed in some embodiments for increasing quality of music playback, for example by playing an alternate version of a detected song, in accordance with an embodiment. In step 802, the system identifies a song being played. In step 804, the system determines whether an alternative version of the song is available at a higher quality. If so, then in step 806, the system identifies the playback point of the currently playing song, for example determining how many seconds have passed since the beginning of the song. Once the playback point has been determined, playback of the higher quality version of the song is initiated at the playback point in step 808, for example by fading into the higher quality version of the song.

A method such as the method of FIG. 8 may be used to detect music, identify they music, and play a different version of the identified music. In one example, the user may be listening to a song being broadcast at a certain quality via the FM radio. A user device, which may include the user's cell phone, smart phone, or audio system embedded in the automobile, detects the music that is played. Based on the methods of this disclosure, the user device identifies the music and searches for alternative versions of the identified song. The alternative versions may include a higher quality version, a version by a different artist, a version that contains explicit lyrics, a version by the same artist but played "live" at a concert, and the like. The alternate versions may be available for free or at a charge to the user. Examples of free music would be music that is already purchased, music that is already stored on the local device, music available through a subscription service and the like. Music available at a charge can include a one-time play fee, a long-term license to the music, or a purchase of a digital download. One version of a high quality song format is Mastering Quality Sound (MQS) format, although certainly other song versions may be listed.

The user device then transitions audio playback to an alternate version of the identified song. The transition may be automatic or manually initiated. An example of an automatic transition includes a transition from playing the song over the FM radio station to playing a higher quality version of the song that is stored on the user's smart phone. An example of a manual transition includes detecting and identifying music played over the FM radio, the user device suggesting an alternative version of the song played by the artist at a recent concert among other options, the user selecting the alternative live version and a payment method, and the user device completing the audio transition to the alternative live version.

The transition to an alternative version may take many forms. The alternative version of the song may be available on the user device—such as the smart phone, on a remote server—such as via cloud storage, on a CD in a CD player connected to an audio system, available through a streaming service, and the like. The user device may stream a music file directly to the audio system (such as the car's audio system) via a communication link or may play the music via its own audio system. Additionally, the user device may direct the audio system to retrieve the music file from a remote server.

In some embodiments, the transition to an alternative version is synchronized so that the user is not able to detect the transition. For example, an audio system may be playing an FM station, including a DJ speaking and the start of a song. The song is detected and identified using the disclosures described herein. The music is synchronized between the FM station and the music to be played via a personal music library. The music from the alternative version, such as a higher quality version, is played. The music then transitions back to the FM Station at the end of the song. It is possible that the user would not otherwise detect the transition except for the improved quality.

In an exemplary embodiment, the music is transitioned to an alternate version but mixes in content from the original source. In this example, the primary music played is the high quality version. However, if additional audio is detected on the original source, such as the DJ talking, the DJ's voice is mixed into the high quality audio playback. In exemplary embodiments, a radio DJ may select the music and provide additional context, such as naming the song and providing traffic updates, and the transition to a high quality or alternate version of the song happens automatically and seamlessly.

In an exemplary method of music transition to an alternate version, in accordance with an embodiment. In such an embodiment, a music recognition engine detects and identifies music played via an FM station at medium quality using the techniques described herein. A play control module is provided to determine the version of the song to be played, either automatically or with user input. A synchronized dissolver module seamlessly transitions the version of the audio to be played. In the example method, the synchronized dissolver plays music either from the FM station or a cloud service, among other options.

In some embodiments, a synchronized dissolver feature compensates for different running times between different versions. Exemplary technologies that may be used to compensate for different running times include time scale modification which extends or compresses a time scale for an audio signal.

In some embodiments, the play control module determines the version of the song to be played based on the availability of different sources. For example, if the FM station temporarily is out of range or the user is transitioning through a bad reception area, the play control module may select a cloud-based version of the song. Alternatively, if a data connection between the cloud based music and the audio playout is interrupted, the play control module may select to play either a buffered version of the song or transition back to the FM version.

In an exemplary embodiment, music playing on an Internet-based radio station is detected and identified. In such an embodiment, the music may be identified by reading metadata contained in the streamed music. The identified song is compared to the songs available in a music library. The play control module determines which version of the song to play. The synchronized dissolver transitions between the internet radio station and the music played from the music library.

As described in further detail below, various other features may also be implemented either individually or as supplemental features to the foregoing embodiments disclosed herein. For example, in some embodiments, a geolocation based music play is enabled. The music play generates a playlist of recommended music based on collected data.

In some embodiments, a user views a friend's social network updates and encounters location metadata in a friend's social media post. The user device recommends adding the user's content that shares the location data detected in the friend's social media post.

In some embodiments, the user device includes an embedded music player, and a user selects a song or album to play. In response to the selected music, the user device displays photos and videos based on the context mixer information. The context mixer information includes location tags, associated emotional state, events, and the like. In such embodiments, the computer processing system may display the photos at all times or be configured only to display the photos when viewers are detected.

In an exemplary embodiment, a user's computer processing system suggests either music, images, or both based on the user returning to a location.

In an exemplary embodiment, context is mixed based on a manually entered location. The manually entered location may be any location that the user desires to create content associated with the location. For example, in preparation for a presentation at a remote office facility, a traveling manager can select the remote office's location to generate content based on the remote office's location. The content of the presentation would be music, photos, and videos associated with the remote office. In some such embodiments, the presentation is a timeline-type presentation, listing the media chronologically.

In an exemplary embodiment, a user controls the shared data. A listens log, containing data associated with music, can be stored in the metadata field of each individual song, or it can be stored in a separate device. As examples, in a cloud music service scenario, the listens log may be stored in a personal area in a network storage. Alternatively the listens log data may be analyzed in a comprehensive way that may include analyzing the data anonymously.

In an exemplary embodiment, the user may only have access to limited data stored in the listens log based on the user not having purchased the song. A user receives full access to listens log data based on either purchasing a song or a subscription service to the full data.

In an exemplary embodiment, the user controls the sensitive information of the listens log. A user controls the sensitive information of the listens log by performing analysis on the data stored in the phone or in a private area on a remote network. The raw data of the listens log is sanitized of sensitive information. The sanitized information may only include a LCP number without the determining factors of the LCP number.

In some embodiments, listens log data is shared anonymously. For example, different users' listens log data may be provided to an anonymous bridge module for privacy protection. The bridge module removes sensitive information from the listens log data and shares the data with a listens log master collection process. The listens log master collection process facilitates in matching detected music from multiple user devices and stores listens log information. The bridge may be located in a remote server or on the user's computer processing system.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary embodiments disclosed herein are implemented using one or more wired and/or wireless network nodes, such as a wireless transmit/receive unit (WTRU) or other network entity.

Figure 9:
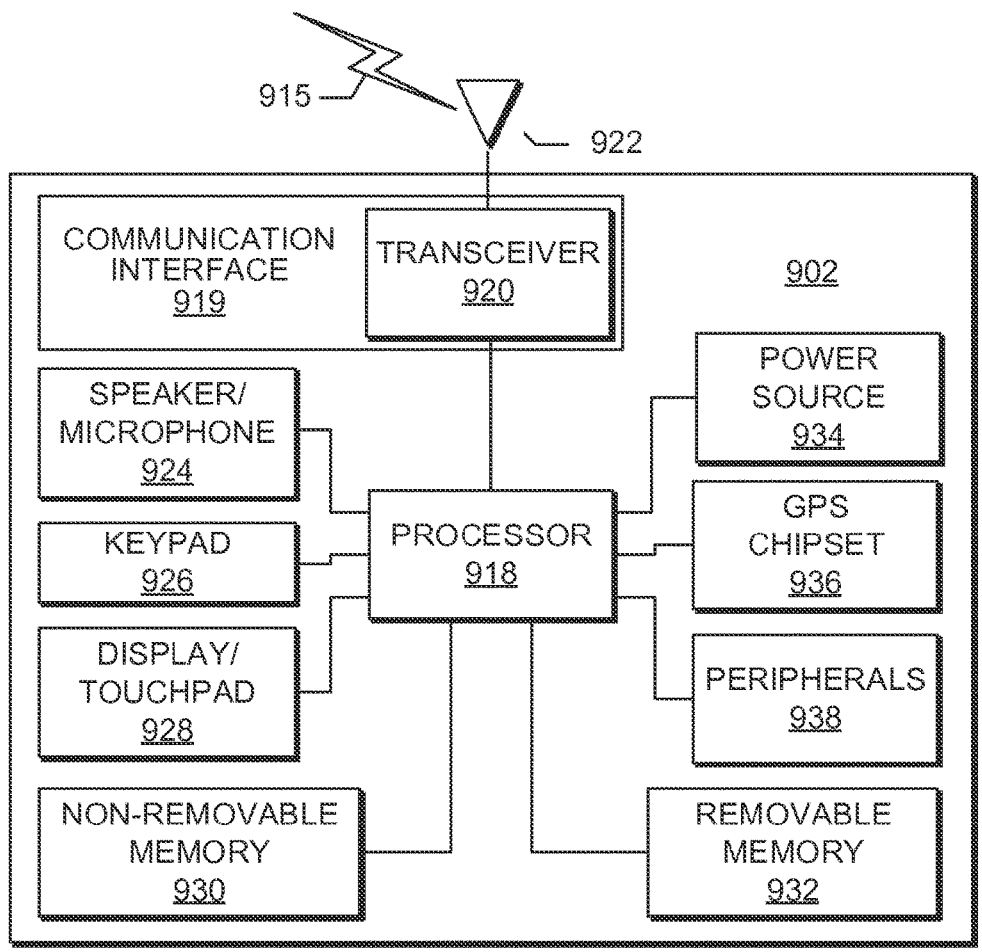
FIG. 9 is a block diagram illustrating the functional architecture of a wireless transmit-receive unit (WTRU) employed as a user device in some embodiments.

FIG. 9 is a system diagram of an exemplary WTRU 902, which may be employed as a user device in embodiments described herein. As shown in FIG. 9, the WTRU 902 may include a processor 918, a communication interface 919 including a transceiver 920, a transmit/receive element 922, a speaker/microphone 924, a keypad 926, a display/touchpad 928, a non-removable memory 930, a removable memory 932, a power source 934, a global positioning system (GPS) chipset 936, and sensors 938. It will be appreciated that the WTRU 902 may include any subcombination of the foregoing elements while remaining consistent with an embodiment.

The processor 918 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 918 may perform signal coding, data processing, power control, input/output processing, and/or any other functionality that enables the WTRU 902 to operate in a wireless environment. The processor 918 may be coupled to the transceiver 920, which may be coupled to the transmit/receive element 922. While FIG. 9 depicts the processor 918 and the transceiver 920 as separate components, it will be appreciated that the processor 918 and the transceiver 920 may be integrated together in an electronic package or chip.

The transmit/receive element 922 may be configured to transmit signals to, or receive signals from, a base station over the air interface 915. For example, in one embodiment, the transmit/receive element 922 may be an antenna configured to transmit and/or receive RF signals. In another embodiment, the transmit/receive element 922 may be an emitter/detector configured to transmit and/or receive IR, UV, or visible light signals, as examples. In yet another embodiment, the transmit/receive element 922 may be configured to transmit and receive both RF and light signals. It will be appreciated that the transmit/receive element 922 may be configured to transmit and/or receive any combination of wireless signals.

In addition, although the transmit/receive element 922 is depicted in FIG. 9 as a single element, the WTRU 902 may include any number of transmit/receive elements 922. More specifically, the WTRU 902 may employ MIMO technology. Thus, in one embodiment, the WTRU 902 may include two or more transmit/receive elements 922 (e.g., multiple antennas) for transmitting and receiving wireless signals over the air interface 915.

The transceiver 920 may be configured to modulate the signals that are to be transmitted by the transmit/receive element 922 and to demodulate the signals that are received by the transmit/receive element 922. As noted above, the WTRU 902 may have multi-mode capabilities. Thus, the transceiver 920 may include multiple transceivers for enabling the WTRU 902 to communicate via multiple RATs, such as UTRA and IEEE 802.11, as examples.

The processor 918 of the WTRU 902 may be coupled to, and may receive user input data from, the speaker/microphone 924, the keypad 926, and/or the display/touchpad 928 (e.g., a liquid crystal display (LCD) display unit or organic light-emitting diode (OLED) display unit). The processor 918 may also output user data to the speaker/microphone 924, the keypad 926, and/or the display/touchpad 928. In addition, the processor 918 may access information from, and store data in, any type of suitable memory, such as the non-removable memory 930 and/or the removable memory 932. The non-removable memory 930 may include random-access memory (RAM), read-only memory (ROM), a hard disk, or any other type of memory storage device. The removable memory 932 may include a subscriber identity module (SIM) card, a memory stick, a secure digital (SD) memory card, and the like. In other embodiments, the processor 918 may access information from, and store data in, memory that is not physically located on the WTRU 902, such as on a server or a home computer (not shown).

The processor 918 may receive power from the power source 934, and may be configured to distribute and/or control the power to the other components in the WTRU 902. The power source 934 may be any suitable device for powering the WTRU 902. As examples, the power source 934 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 918 may also be coupled to the GPS chipset 936, which may be configured to provide location information (e.g., longitude and latitude) regarding the current location of the WTRU 902. In addition to, or in lieu of, the information from the GPS chipset 936, the WTRU 902 may receive location information over the air interface 915 from a base station and/or determine its location based on the timing of the signals being received from two or more nearby base stations. It will be appreciated that the WTRU 902 may acquire location information by way of any suitable location-determination method while remaining consistent with an embodiment.

The processor 918 may further be coupled to other peripherals 938, which may include one or more software and/or hardware modules that provide additional features, functionality and/or wired or wireless connectivity. For example, the peripherals 938 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 10:
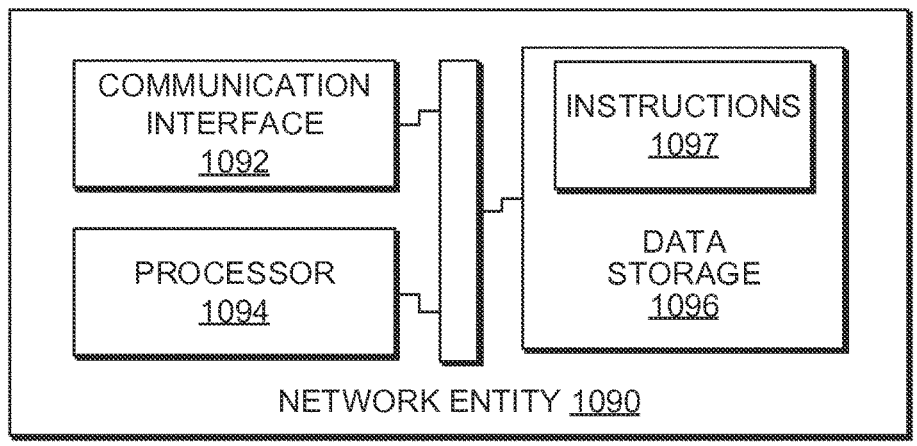
FIG. 10 is a block diagram illustrating the functional architecture of a network entity that may be used in some embodiments for song identification and/or for maintaining of a listens count point database.

FIG. 10 depicts an exemplary network entity 1090 that may be used in embodiments of the present disclosure, for example as a network server used for tracking listens count points and/or for comparing detected audio fingerprints with a database of audio fingerprints. As depicted in FIG. 10, network entity 1090 includes a communication interface 1092, a processor 1094, and non-transitory data storage 1096, all of which are communicatively linked by a bus, network, or other communication path 1098.

Communication interface 1092 may include one or more wired communication interfaces and/or one or more wireless-communication interfaces. With respect to wired communication, communication interface 1092 may include one or more interfaces such as Ethernet interfaces, as an example. With respect to wireless communication, communication interface 1092 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 1092 may be equipped at a scale and with a configuration appropriate for acting on the network side—as opposed to the client side—of wireless communications (e.g., LTE communications, Wi-Fi communications, and the like). Thus, communication interface 1092 may include the appropriate equipment and circuitry (perhaps including multiple transceivers) for serving multiple mobile stations, UEs, or other access terminals in a coverage area.

Processor 1094 may include one or more processors of any type deemed suitable by those of skill in the relevant art, some examples including a general-purpose microprocessor and a dedicated DSP.

Data storage 1096 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 10, data storage 1096 contains program instructions 1097 executable by processor 1094 for carrying out various combinations of the various network-entity functions described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
operating a portable user device to identify a song being played, wherein identifying the song being played includes comparing a sample audio fingerprint to a database of stored audio fingerprints, the sample audio fingerprint generated from an audio signal detected by a microphone, wherein identifying the song being played further includes determining that the portable user device and a secondary user device are in proximity to one another, and generating a second audio fingerprint from a second audio signal detected by a second microphone on the secondary user device;
operating the portable user device to detect whether a user has increased a volume of the song being played;
determining a listening metric for the song based at least in part on whether the user has increased the volume of the song being played;
updating a listening metric database entry for the song based on the determined listening metric for the song; and
generating a song recommendation based at least in part on the listening metric for the song.

2. The method of claim 1, wherein generating a song recommendation comprises generating a playlist of songs from among songs having the highest total listening metric in the listening metric database.

3. The method of claim 2, further comprising playing the playlist for the user.

4. The method of claim 1, wherein the listening metric database entry is a total listening metric for the song, and wherein updating the listening metric includes adding the determined listening metric to the total listening metric.

5. The method of claim 1, wherein operating the portable user device to detect whether the user has increased the volume of the song comprises detecting an increase in sound level of the song arriving at the microphone.

6. The method of claim 1, wherein comparing the sample audio fingerprint to the database of stored audio fingerprints includes:
combining the sample audio fingerprint and the second audio fingerprint to generate a combined audio fingerprint; and comparing the combined audio fingerprint to the database of stored audio fingerprints.

7. The method of claim 1, wherein the song is being played by the portable user device, and wherein operating the portable user device to detect whether the user has increased the volume of the song comprises detecting the user's interaction with a volume button on the portable user device.

8. A method comprising:
determining that a first user device and a second user device are in proximity to one another;
determining a first audio fingerprint based on a first audio signal captured by the first user device;
determining a second audio fingerprint based on a second audio signal captured by the second user device; and
identifying a song based on the first audio fingerprint and the second audio fingerprint.

9. The method of claim 8, wherein identifying a song based on the first audio fingerprint and the second audio fingerprint comprises:
combining the first and second audio fingerprints to generate a combined audio fingerprint; and
identifying the song based on the combined audio fingerprint.

10. The method of claim 9, wherein identifying the song comprises comparing the combined audio fingerprints to a database of stored audio fingerprints.

11. The method of claim 8, wherein determining the first audio fingerprint comprises receiving data representing the first audio signal and generating the first audio fingerprint from the data representing the first audio signal.

12. The method of claim 8, wherein determining the first audio fingerprint comprises receiving the first audio fingerprint from the first user device.

13. The method of claim 8, further comprising conveying information identifying the song to at least the first user device.

14. An apparatus comprising a processor configured to perform at least:
determining that a first user device and a second user device are in proximity to one another;
determining a first audio fingerprint based on a first audio signal captured by the first user device;
determining a second audio fingerprint based on a second audio signal captured by the second user device; and
identifying a song based on the first audio fingerprint and the second audio fingerprint.

15. The apparatus of claim 14, wherein identifying a song based on the first audio fingerprint and the second audio fingerprint comprises:
combining the first and second audio fingerprints to generate a combined audio fingerprint; and
identifying the song based on the combined audio fingerprint.

16. The apparatus of claim 15, wherein identifying the song comprises comparing the combined audio fingerprints to a database of stored audio fingerprints.

17. The apparatus of claim 14, wherein determining the first audio fingerprint comprises receiving data representing the first audio signal and generating the first audio fingerprint from the data representing the first audio signal.

18. The apparatus of claim 14, wherein determining the first audio fingerprint comprises receiving the first audio fingerprint from the first user device.

19. The apparatus of claim 14, wherein the processor is further operative to convey information identifying the song to at least the first user device.

* * * * *